United States Patent Office 2,980,669
Patented Apr. 18, 1961

2,980,669

METHYLENE BIS SULFONAMIDO PYRAZOLES

Jean Druey, Riehen, and Paul Schmidt, Therwil, Switzerland, assignors to Ciba Pharmaceutical Products Inc., Summit, N.J.

No Drawing. Filed Apr. 21, 1959, Ser. No. 807,779

Claims priority, application Switzerland Apr. 23, 1958

2 Claims. (Cl. 260—239.9)

This invention provides a new sulfonamide derivative, namely N:N'-methylene-bis-[3-(p-amino-benzene-sulfonamido)-2-phenyl-pyrazole], and a process for its manufacture.

The new compound possesses valuable therapeutic properties. Thus it is, inter alia, active against coli bacteria and can therefore be used as a medicament and prophylactic, especially in the case of infectious diseases of the intestine.

N:N'-methylene-bis-[3-(p-amino - benzene - sulfonamido)-2-phenyl-pyrazole] is obtained according to the invention when 3-(p - amino - benzene - sulfonamido)-2-phenyl-pyrazole is reacted in the presence of a dilute acid with formaldehyde, which can also be used in the form of a substance providing formaldehyde, such as paraformaldehyde or hexamethylene tetramine. The reaction is advantageously carried out in the presence of water and at room temperature or with gentle heating. As acids there come into consideration primarily strong inorganic acids, such as hydrohalic acids, sulfuric acid, perchloric acid, phosphoric acid and the like.

The new sulfonamide derivative can be used as a medicament for example in the form of pharmaceutical preparations containing it in admixture with a pharmaceutical organic or inorganic, solid or liquid carrier material, especially one suitable for enteral administration. For their production such substances are concerned as do not react with the new compound, for example, water gelatine, lactose, starch, magnesium stearate, talc, vegetable oils, benzyl alcohols, gums, polyalkylene glycols or other known medicament carriers. The pharmaceutical preparations can be made up, for example, in the form of tablets or dragees or in liquid form as solutions, suspensions or emulsions. If desired they are sterilized and/or contain auxiliary substances such as preserving, stabilising, wetting or emulsifying agents, salts for variation of the osmotic pressure or buffer substances. They can also contain other therapeutically valuable substances. The preparations are produced by customary methods. They contain from about 10% to about 90% of the active compound.

The following example illustrates the invention:

*Example*

A solution of 31.4 grams of 3-(p-amino-benzene-sulfonamido)-2-phenyl-pyrazole in 600 cc. of 3 N-hydrochloric acid is treated with stirring, within 5 minutes, with 25 cc. of 40% aqueous formaldehyde solution. After about 10 minutes the pH is adjusted to 7 with an aqueous concentrated sodium hydroxide solution. The product is filtered with suction and the residue well washed with warm water. The difficultly soluble N:N'-methylene-bis-[3-(p-amino-benzene-sulfonamido)-2-phenyl-pyrazole] of the formula

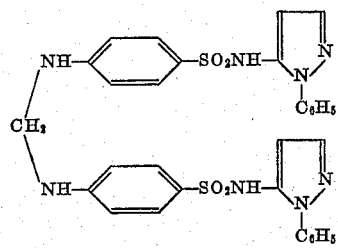

is thus obtained as a monohydrate in white crystals of M.P. 208–210° C. The water can be removed by heating for several hours at 150° C. under 0.1 mm. of pressure.

What is claimed is:
1. N:N'-methylene-bis-[3-(para-amino - benzene - sulfonamido)-2-phenyl-pyrazole].
2. Monohydrate of the compound claimed in claim 1.

References Cited in the file of this patent

UNITED STATES PATENTS 2,858,309     Druey et al. _____ Oct. 28, 1958

FOREIGN PATENTS 162,227     Austria _____ Feb. 10, 1949
169,575     Austria _____ Nov. 26, 1951

OTHER REFERENCES

Druey: Helvetica Chim. Acta, vol. 31, pp. 179–83 (1948).